United States Patent

[11] 3,536,197

| [72] | Inventor | Samuel L. Ward |
| | | West Hartford, Connecticut |
| [21] | Appl. No. | 776,031 |
| [22] | Filed | Nov. 15, 1968 |
| [45] | Patented | Oct. 27, 1970 |
| [73] | Assignee | Crystalab Inc. |
| | | Hartford, Connecticut |
| | | a corporation of Connecticut |

[54] LIQUID TREATING APPARATUS
4 Claims, 7 Drawing Figs.

[52] U.S. Cl. .................................................. 210/120,
210/250, 210/282, 210/472
[51] Int. Cl. .................................................. B01d 27/08
[50] Field of Search .......................................... 210/117,
120, 148, 244, 245, 249, 250, 282, 455, 464, 465,
472, 85

[56] References Cited
UNITED STATES PATENTS

| 285,965 | 10/1883 | Burgess | 210/472X |
| 1,213,320 | 1/1917 | Whitaker | 210/464 |
| 2,359,943 | 10/1944 | Schlumbohn | 210/455 |
| 2,389,185 | 11/1945 | Dick | 210/472 |
| 2,456,524 | 12/1948 | Meincke | 210/244X |
| 2,761,833 | 9/1956 | Ward | 210/85 |
| 2,799,437 | 7/1957 | Jepson | 210/472X |

Primary Examiner—John W. Adee
Attorney—I. Jordan Kunik

ABSTRACT: A liquid treating and filtering apparatus comprising a combination of a filter bottle and a detachable filter cartridge including a one-way valve in the filter bottle. The One-way valve enables the bottle first to be filled with liquid and thereafter, when the bottle is overturned, permits the liquid to flow by gravity through the filter cartridge.

Patented Oct. 27, 1970
3,536,197
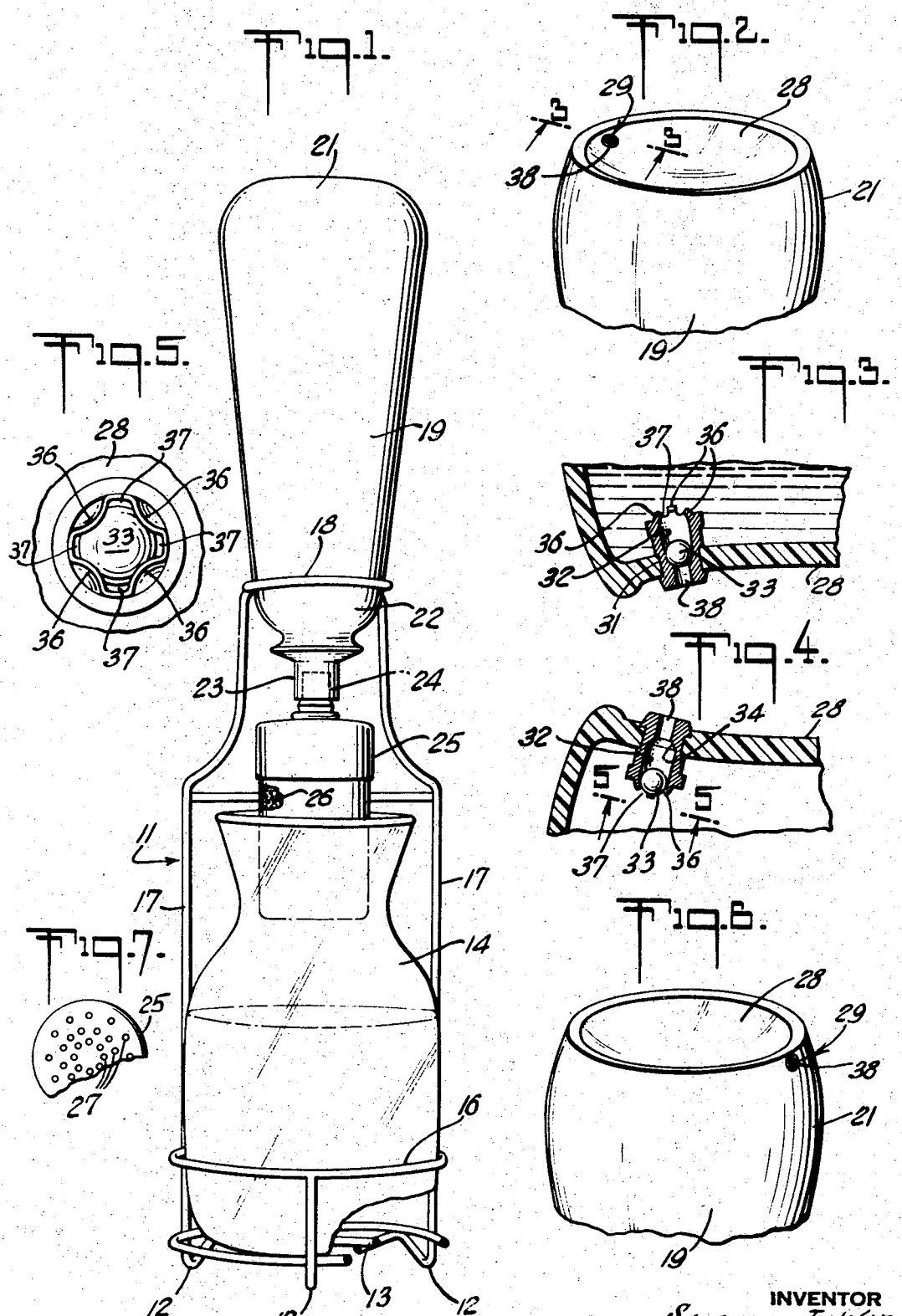
INVENTOR
SAMUEL I. WARD
BY
R. Jordan Lunick
ATTORNEY

३,५३६,१९७

LIQUID TREATING APPARATUS

BACKGROUND OF THE INVENTION

1. FIELD OF THE INVENTION

This invention relates to water purifying and filtering apparatus and, more particularly, to the incorporation of suitable valve means in a self-filtering bottle to enable the latter to be filled and then to permit liquid to flow by gravity from said bottle through a filter cartridge.

2. DESCRIPTION OF THE PRIOR ART

Liquid treating apparatus has previously been disclosed by the same inventor in U.S. Pat. No. 2,761,833, issued Sept. 4, 1956, which describes the combination of a filter bottle and replaceable filter cartridge. In that disclosure, the liquid in the filter bottle was forced through the filter cartridge by means of pressure brought to bear upon the flexible walls of the bottle. Unless such pressure was exerted, little if any liquid moved from the bottle through the cartridge even when the combination was placed vertically in a position where the filter bottle was located directly above the cartridge. The reason that liquid did not flow by gravity was due to the fact that a vacuum or negative pressure condition existed above the liquid level in the bottle and prevented the liquid from moving downward into and through the filter cartridge.

There are presently available various products which purify water for household use. Such products usually comprise a housing which contains a filter, one end of said container being connected by suitable flexible tubing to the water tap of a kitchen or bathroom sink, the other end of said housing having a spigot through which the filtered water flows to be collected into a glass, bottle, or other suitable reservoir container.

Such devices are less than satisfactory because of the difficulty of adjusting the proper flow rate of the water by means of manipulating the water tap handle. Too fast a flow with attendant high hydraulic pressure will cause the water to be insufficiently treated by the filter, besides subjecting the container, the filter, and the hose couplings to possible fracture or other damage. Too slow a flow rate would make the whole process very tedious and time-consuming. Most of all, the apparatus prevents the water tap from being used for other purposes, such as dish washing, face cleansing, and the like.

SUMMARY OF THE INVENTION

The object of the present invention was to overcome the disadvantages of the faucet-connected apparatus and to obviate the necessity for producing a manual queezing action on a liquid filtering bottle in order to produce the filtering action. This is especially important when dealing with large volumes of liquid to be filtered such as for household use where water from a tap happens to have a bad odor or taste and, in some cases, where it is desired to remove such materials as chlorine and fluorides from the water supply.

Accordingly, the present invention comprises a liquid filtering bottle into which water is poured from a household tap or the like, when the bottle is in the upright position, after which a filter cartridge is detachably connected to the mouth of the bottle.

Thereafter, the assembly of the liquid bottle and cartridge are inverted so that the liquid in the bottle may flow by gravity through the cartridge and into a suitable reservoir bottle which will receive the purified or treated liquid for use or storage.

In order to overcome the negative pressure above the water level when the bottle is inverted, which would otherwise prevent the liquid in the bottle from passing by gravity from the filter cartridge, there is provided at or near the bottom of the bottle a one-way valve which, when the bottle is inverted, permits atmospheric air to enter therethrough and provide suitable atmospheric pressure to urge the water in the bottle to flow by gravity through the filter cartridge.

The one-way valve is operative when the liquid bottle is in the upright position to prevent the liquid from leaking therefrom when the bottle is filled with water.

By means of the incorporation of the one-way valve at or near the bottom of the liquid bottle, it is now possible to treat or filter water and other liquids by the simple means of filling a bottle, attaching the filter cartridge thereto, and inverting the assembly over a reservoir bottle. The advantage realized is that it is not necessary to immobilize a water tap which is free to be used for its other intended purposes while, at the same time, the filtering action can take place unattended.

A suitable frame is provided which supports the filter bottle and filter cartridge in an inverted position with the reservoir bottle located directly underneath the cartridge so that the purified or filtered water may be collected and stored.

BRIEF DESCRIPTION OF THE DRAWINGS

FIG. 1 is an elevation of the apparatus of the present invention, some parts being broken away and some parts shown in dotted outline;

FIG. 2 is a fragmentary perspective view of the bottom of the self-filtering bottle showing the manner in which the valve element is incorporated therein;

FIG. 3 is a greatly enlarged fragmentary section view taken on line 3–3 of FIG. 2 when said bottle is in an upright position;

FIG. 4 is a fragmentary view similar to FIG. 3 where the filtering bottle is in the inverted position as shown in FIG. 2;

FIG. 5 is a still further enlarged fragmentary view taken on line 5–5 of FIG. 4;

FIG. 6 is somewhat similar to FIG. 2 showing an alternative location for the valve element placed in the lower shoulder portion of the filtering bottle; and FIG. 7 is a fragmentary view of the bottom of the filter cartridge.

DESCRIPTION OF THE PREFERRED EMBODIMENTS

Referring now to the drawing in detail, there is shown in FIG. 1 a caddy or frame generally designated 11, made of bent wire or the like, said frame having a plurality of integrally formed legs 12 which support a wire-formed platform 13 upon which a reservoir bottle 14 rests. A circular wire 16 formed on frame 11 and spaced upwardly from platform 13 surrounds bottle 14 to stabilize the latter within said frame.

Frame 11 has a pair of vertical wire elements 17 which terminate at their upper ends in a substantially circular ring 18 which supports an inverted filtering bottle 19. Filtering bottle 19 tapers between a broad base portion 21 and a narrowed shoulder portion 22 which extends partially through ring 18 whose diameter is somewhat smaller than that of said base portion and somewhat larger than said shoulder portion whereby said bottle may be supported thereon.

Filtering bottle 19 has a mouth 23 which cooperates by means of a leak-tight press fit with the neck 24 of a filter cartridge 25.

Cartridge 25 may be made of a suitable material, as for example, a plastic material which is either transparent or translucent, and contains a packing 26 of a suitable filtering medium which is selected for various filtering purposes. Said filtering medium 26 may be of the type that serves as a mechanical filter for water or the like passing therethrough to eliminate physical impurities such as suspended particles or the like. In other embodiments, the filtering medium 26 may be made of various types of activated charcoals which are adapted to remove objectionable tastes, odors, and discolorations from the raw water contained in filtering bottle 19. Said charcoals may also be adapted to remove chlorine or chlorinated matter from treated water as well as to remove such materials as dissolved fluorides or fluoride salts in the raw water within filtering bottle 19.

It is intended to pour raw water into filtering bottle 19 from a source such as a sink tap or faucet or the like while said bottle is in the upright position. Thereafter, filter cartridge 25 is connected to bottle 19 and the assembly of said bottle and said cartridge is inverted and located upon the frame whereby said bottle rests upon ring 18 while cartridge 25 extends at least partially into the mouth of reservoir bottle 14. The bottom of filter cartridge 25 is provided with a plurality of apertures 27 whereby liquid flowing from bottle 19 into and through cartridge 25 will drop through said apertures into reservoir bottle 14.

The foregoing filtering action, however, would be impossible if filtering bottle 19 should have a solid, impenetrable bottom wall since a vacuum or negative pressure is soon created within the bottle which would prevent the flow of water by gravity therefrom into and through the cartridge.

In order to obviate this difficulty, there is incorporated into the bottom floor 28 of bottle 19 a one-way valve generally designated 29. See FIGS. 2, 3, 4 and 5. Valve 29 is a generally tubular element made of a suitable material such as metal, plastic, or the like, having a peripheral annular recess 31 which forms a liquid-tight seal with floor 28 of bottle 19.

Located in the interior aperture 32 of valve 29 is a ball valve element 33 which is movable freely longitudinally therein. When bottle 19 is in the upright position as shown in FIG. 3, ball 33 rests upon and forms a liquid-tight seal with an annular valve seat 34 formed toward one end of interior aperture 32, thereby preventing leakage of water from said bottle when the latter is being filled.

When bottle 19 is in the inverted position as shown in FIGS. 2 and 4, ball 33 has moved toward the end of valve 29 which extends into the interior of said bottle and terminates in a plurality of spaced apart fingers 36. Fingers 36 curve inwardly to form a web against which ball 33 is held captive within valve 29. Spaces 37 between fingers 36 permit atmospheric air to enter into aperture 38 of valve 29, bypass ball 33, and enter into the interior of bottle 19. See FIGS. 4 and 5.

Thus, atmospheric pressure permits the liquid in bottle 19 to flow by gravity into and through cartridge 25 and thence through apertures 27 into reservoir bottle 14 where the filtered or purified water or liquid is collected. After bottle 19 is empty, the assembly of said bottle and cartridge 25 is lifted away from frame 11 and bottle 14 may be removed from said frame for dispensing the purified liquid or water therein, or for storage in a refrigerator or the like. A suitable cap such as a tight-fitting flexible plastic rimmed disc may be provided for enclosing the mouth of the bottle 14 while the purified liquid therein is stored away.

Although filtering bottle 19 may be made of any suitable material such as metal or glass, it may also be made of a flexible plastic material. When bottle 19 is made of a flexible plastic material, its walls may be intermittently squeezed by hand in order to accelerate the flow of liquid through cartridge 25 while the bottle-cartridge assembly is in the inverted position, as shown in FIG. 1. By this squeezing action, valve ball 33 will move upwardly against valve seat 34 to seal the contents of the bottle in order that the reduced volume therein caused by the squeezing action will force the liquid therein to move under pressure through the cartridge.

Although the present invention has been described with reference to particular embodiments and examples, it will be apparent to those skilled in the art that variations and modifications can be substituted therefor without departing from the principles and true spirit of the invention.

I claim:

1. A liquid treating apparatus comprising a bottle, a filter cartridge detachably connected to said bottle, and a one-way valve at the bottom of said bottle, said valve sealing said bottle when the latter is in the upright position for filling with liquid, said valve opening the interior of said bottle to atmospheric pressure when said bottle is inverted for permitting the liquid therein to flow by gravity through said cartridge.

2. Apparatus according to claim 1 wherein said one-way valve comprises a tubular element incorporated into the bottom of said bottle with a liquid tight seal, a ball movable within said element into either of first and second locations, said ball in said first location forming a seal preventing the leaking of liquid from said bottle when the latter is in the upright position, said ball in the second location permitting atmospheric air to enter the interior of said bottle when the latter is in the inverted position.

3. A liquid treating apparatus comprising a frame, a reservoir bottle removably positioned in said frame, a holder on said frame located above the mouth of said reservoir bottle, a filter bottle, said frame supporting said filter bottle in an inverted position above said reservoir bottle, a filter cartridge detachably connected to said filter bottle and located above the mouth of said reservoir bottle when said filter bottle is supported in said holder, and a one-way valve at the bottom of said filter bottle, said valve sealing the bottom of said filter bottle when the latter is in the upright position and is filled with liquid, said valve permitting atmospheric air to enter said bottle when the latter is in the inverted position to permit liquid therein to flow by gravity through said cartridge into said reservoir bottle.

4. Apparatus according to claim 3 wherein said frame is made of wire bent to provide a platform for said reservoir bottle and to form said holder within which said filter bottle is supported.